Jan. 2, 1962 L. J. SEMON 3,015,700

HEAD SET ADAPTER FOR CORD OPERATED SWITCHBOARDS

Filed Oct. 31, 1960

INVENTOR.
LAWRENCE J. SEMON
BY
Elliott & Pastoriza
ATTORNEYS

United States Patent Office 3,015,700
Patented Jan. 2, 1962

3,015,700
HEAD SET ADAPTER FOR CORD OPERATED SWITCHBOARDS

Lawrence J. Semon, 918 Ocean Front, Santa Monica, Calif.

Filed Oct. 31, 1960, Ser. No. 66,017
3 Claims. (Cl. 179—42)

Figures 1, 2:
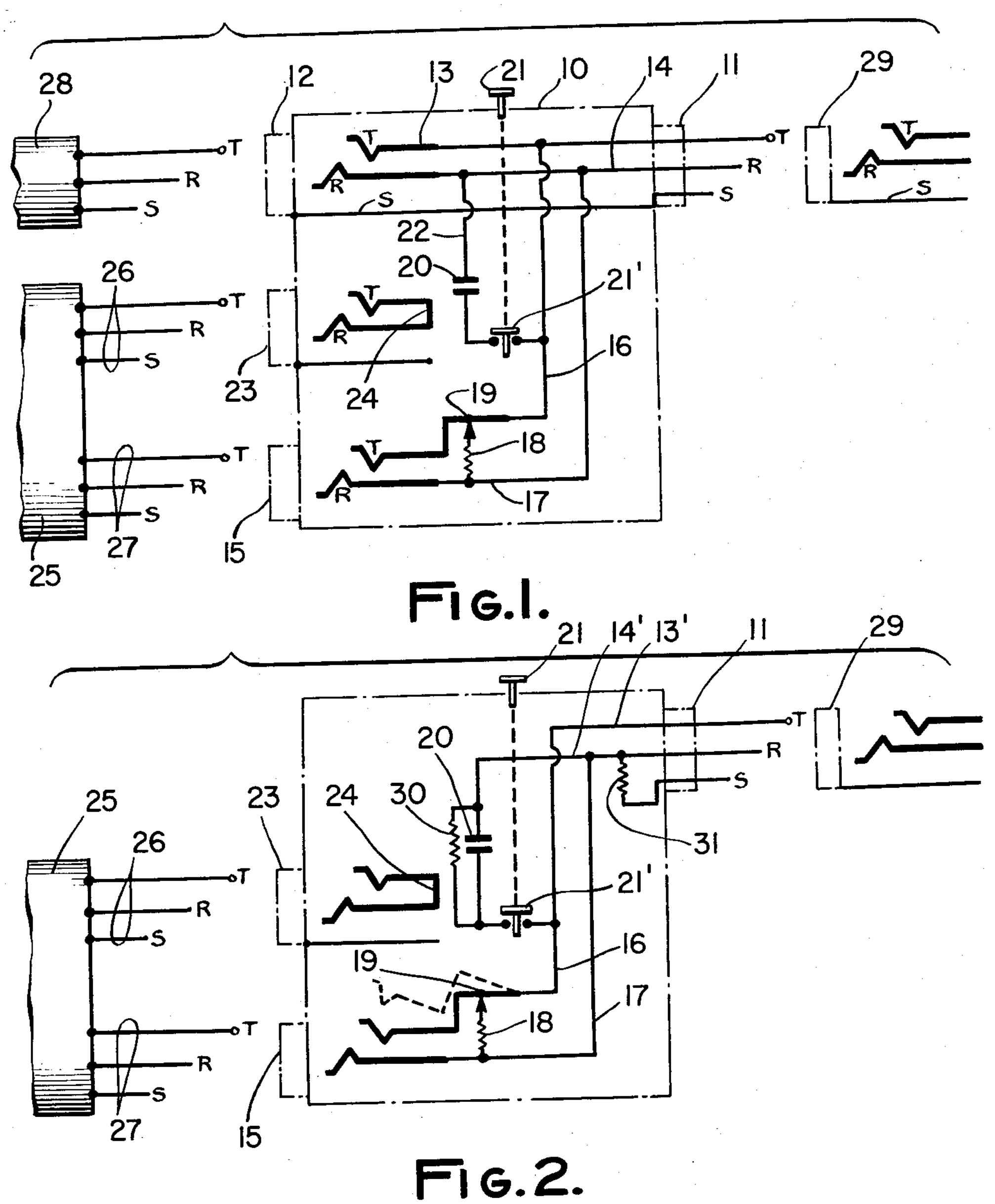

This invention relates to cord-operated telephone switchboards and more particularly, to the provision of a novel head set adapter to assist the regular operator during peak traffic loads in answering incoming calls.

This application is a continuation-in-part of my copending patent application, Serial No. 716,964, filed February 24, 1958, and entitled "Head Set Adapter for Cord-Operated Switchboards," now abandoned. As in the case of the head set adapter described in the aforementioned patent application, the instant head set adapter may be used by any person where cord-operated telephone switchboards are used in the conduct of business, whether they be private branch exchange systems, hotel switchboards, telephone answering intercept switchboards, or those manually operated within telephone companies.

A primary object of this invention is to enable an emergency operator or an additional attendant to operate a switchboard without the normal requirement of being seated at the switchboard and of her head set being connected to the circuits associated with cord-operated telephone switchboards.

Other objects of this invention are the realization of increased efficiency accruing to the public benefit in the communication of information and intelligence over and through the facilities of cord-operated switchboards, the elimination of audible discomfort to both the caller and the additional attendant when plugging the head set adapter into an activated switchboard jack, and the unlimited facility by which cord plugs may be substituted through the head set adapter while holding the call on a switchboard jack.

With respect to the last mentioned objective, the ability to hold an incoming call on a switchboard jack while substituting another cord plug for the one originally used to answer the call is not possible on many newer type switchboards. Nor is it possible on older boards modified with special jacks used in connection with concentrator-identifier equipment without the use of specially installed conference, transfer, or universal jacks. These specially installed jacks are offered by various telephone companies in some areas but can only be used by the operators immediately adjacent to the switchboard.

In California, the Pacific Telephone Company offers a "position-splitting" arrangement through which a switch divides the board in two so that a second operator, by plugging her head set into the switchboard circuits, may serve as an emergency attendant during peak traffic loads. However, the normal switchboard is less than twenty-seven inches wide by outside measurement and allows very little elbow room for one operator, let alone two.

The present invention contemplates the provision of a novel head set adapter unit which will increase the efficiency of service on all types of cord-operated switchboards. The greatest application of the invention, however, will undoubtedly be on telephone answering switchboards which normally are wired for from 80 to 100 secretarial jacks plus administrative station jacks and trunk line jacks. The secretarial jacks are mostly used for extensions from other subscribers' primary services.

The normal operation of a telephone answering switchboard and the manner in which the present invention is employed therein may be described briefly as follows:

When any line appearing on a telephone answering switchboard has been dialed and rings in, the line lamp associated with the particular jack on the switchboard lights up as the buzzer sounds. The operator inserts the plug of an answering cord into the jack and by opening the key associated with the cord used, establishes the talking and listening paths between her and the caller. In order to accomplish this, her head set twin-pronged plug must be inserted into the head set jack of the switchboard.

During peak traffic loads, there are more calls ringing in on a switchboard than one operator can possibly handle in an efficient manner. By means of the head set adapter of the present invention, a supervisor or an emergency operator, or an operator from an idle board far removed from the one experiencing the peak load, may assist this burdened operator without the necessity of being plugged into any switchboard. This is accomplished by inserting the twin prong head set plug into the head set adapter and then inserting a plug forming a part of the adapter into the switchboard jack. The additional attendant may then handle the particular call through the head set adapter while the regular operator has her key open and is talking on another call simultaneously on the same switchboard.

Should the caller require more information and service than the additional attendant or emergency operator is able to provide, she may say "One moment please" to the caller and extract the twin prong head set plug from the head set adapter and substitute the plug of the answering cord associated with the switchboard, this answering cord being received directly in the head set adapter. The regular operator connected to the switchboard by opening the key associated with such cord plug may then take over the call.

A better understanding of the head set adapter will be had by now referring to preferred embodiments thereof as illustrated in the accompanying drawings, in which:

FIGURE 1 is a schematic wiring diagram illustrating a first embodiment of the head set adapter of this invention; and, FIGURE 2 illustrates a modified form of the adapter shown in FIGURE 1.

Referring first to FIGURE 1, the head set adapter comprises generally a plug member 10 having a standard plug 11 extending from one end thereof. The plug 11 includes the conventional tip, ring, and sleeve connections designated in FIGURE 1 as T, R, and S, respectively. Plug member 10 also includes a standard socket 12 including tip, ring, and sleeve connectors connected straight through to the corresponding tip, ring, and sleeve connectors of the plug 11 by suitable conductor means 13 and 14. The connection of the sleeves may be effected through the medium of the unit 10 itself in those instances where the sleeves constitute ground terminals.

Also included in the plug member 10 is a head set prong receiving socket 15 including suitable conductors 16 and 17 connecting respectively in parallel with the conductors 13 and 14 between the plug 11 and socket 12. A resistance 18 connects across the conductors 16 and 17 in a manner such as to engage the conductor 17 through a contact means 19. This contact means 19 forms a portion of the conductor 16 such that when a plug is received within the socket 15, the contact portion 19 will be biased apart from the resistance 18 when the connection is being effected to break the circuit between the resistance 18 and conductor 16 as indicated by the dotted line position. Similarly, when a plug is removed from the socket 15, the contact means 19 will engage resistance 18 so that the resistance 18 will be across the conductor 16 and conductor 17 and thus across the corresponding tip and ring conductors 13 and 14 of the standard plug 11.

Also included in the circuit is a condenser 20 connected in series with push button contact 21 operable by push button 21' at the top of the unit 10. This series circuit in turn is shunted across tip and ring conductors 13 and 14 as by leads 22 and 16 as shown. With this arrangement, depression of the button 21 will place the condenser 20 across the terminals to prevent aural shock upon insertion or removal of the unit.

Since all standard head set plugs are of the twin prong variety, the adapter 10 also includes a dummy socket 23 in which the tip and ring conductors are shorted as at 24.

Also shown in the left side of FIGURE 1 is the conventional twin prong head set plug 25 including plug members 26 and 27 arranged to be received respectively in the jacks 23 and 15. The jack 12 in turn may receive a conventional cord plug 28. The switchboard jack is indicated at the righthand portion of FIGURE 1 at 29 and is arranged to receive the plug 11 of the unit 10 when in use.

In the operation of the head set adapter 10, when an incoming call is received during a peak load period, an emergency attendant or auxiliary operator may take the call by simply inserting the standard plug 11 of her head set adapter 10 into the standard board jack 29 and then plugging her twin prong head set plug 25 into the sockets 23 and 15. Reception of the plug 27 in the jack 15 will disengage the contact 19 from the resistance 19. Since the conductors 16 and 17 are connected in parallel with the conductors 13, and 14, there is provided a straight through talking channel between the tip and ring terminals of the head set prong 27 and the corresponding tip and ring terminals T and R of the standard board jack 29. The auxiliary operator may then handle the call.

Should the regular operator become free to take the call, she may plug the plug cord corresponding to 28 in FIGURE 1 directly into the standard jack 12 and the straight through connection with conductors 13 and 14 is provided, the emergency operator simply removing her head set twin prong plug 25 for use elsewhere. It should be noted that if the head set twin prong plug 25 is removed prior to insertion of the plug 28, the removal of the plug 25 will permit the contact means 19 to close on the resistance 18, thus holding the call.

Whenever the head set adapter plug member 10 is inserted or removed, the operator depresses the button 21 to throw the condenser 20 across the tip and ring conductors and thus inhibit aural shock.

Referring now to FIGURE 2, there is shown a slightly modified version of the head set adapter. In FIGURE 2, the elements that are the same as those in FIGURE 1 are designated by the same numerals. The only difference in the embodiment of FIGURE 2 is the omission of the jack 12 shown in FIGURE 1, the addition of a resistance 30 shunting the condenser 20, and the addition of a resistance 31 between the ring and sleeve conductors at the standard output plug 11. The conductors corresponding to the conductors 13 and 14 terminate at their connections to the paralleled conductors 16 and 17 as indicated at 13' and 14'. Every other feature of the circuit is identical to that of FIGURE 1.

The operation of the device of FIGURE 2 is the same as that of FIGURE 1 except that the standard plug 28 of FIGURE 1 is inserted in the socket 15 instead of an additional socket such as shown at 12 in FIGURE 1. When the standard plug 28 is inserted in the socket 15; that is, substituted for the head set twin-pronged plug 25, the contact means 19 will be disengaged from the resistance 18 and thus a straight through talking circuit will be provided through the conductors 16 and 17 to the standard board jack 29 in the same manner that the conductors 13 and 14 established the straight through talking path for the standard cord plug 28 of FIGURE 1.

The shunting resistance 30 across the condenser 20 improves the filtering action in the circuit when the button 21 is depressed and reduced further any aural shock. Further, this resistance will hold a call on the tip and ring while substituting the cord 28 of FIGURE 1 for the head set plug 27 in the event the contact 19 fails to make contact before it breaks its connection with the resistance 18.

The provision of the resistance 31 between the sleeve and ring conductors has been found to eliminate a humming action when the head set adapter plug 10 is employed on Eastern type switchboards. In these latter type switchboards, the sleeve forms an active part of the switchboard circuit and by providing the small resistance 31, improved operation results.

From the foregoing, it is apparent that I have invented a head set adapter for use with all types of cord-operated switchboards to increase the speed with which calls are answered and also to hold the calls on the line while substituting answering cord plugs to the extent necessary for the proper conclusion of the call. This is a heretofore unaccomplished result on all cord-operated switchboards.

What is claimed is:

1. A head set adapter for cord-operated telephone switchboards, comprising: a plug member having a standard plug at one end and a standard jack socket at its other end; conductor means in said member connecting said standard plug to said standard socket; a head set socket having terminals in said plug member connected in parallel with said conductor means; a resistance element in said member normally connected across said terminals of said head set socket; contact means within said member connected between one end of said resistance element and one of said terminals of said head set socket, said contact means being positioned to be engaged by a head set plug upon insertion into said head set socket for disconnecting said resistance element and to be released by said head set plug upon removal of said head set plug for reconnecting said resistance element; a condenser in said member; and manually operable switch means for connecting said condenser across said conductor means to inhibit aural shock when inserting said standard plug into a switchboard.

2. A head set adapter for cord-operated telephone switchboards, comprising: a plug member having a standard plug at one end and a head set socket at its other end terminating in terminals in said plug member; conductor means in said member connecting said standard plug to said head set socket terminals; a resistance element in said member normally connected across said terminals of said head set socket; contact means within said member connected between one end of said resistance element and one of said terminals of said head set socket, said contact means being positioned to be engaged by a head set plug upon insertion into said head set socket for disconnecting said resistance element and to be released by said head set plug upon removal of said head set plug for reconnecting said resistance element; a condenser in said member; and manually operable switch means for connecting said condenser across said conductor means to inhibit aural shock when inserting said standard plug into a switchboard.

3. The subject matter of claim 2, including a resistance shunting said condenser to provide additional filtering action for said aural shock, said standard plug including sleeve, tip, and ring conductors; and an additional resistance connected between the sleeve and ring conductors of said standard plug.

No references cited.